United States Patent
Horesh (10) Patent No.: US 11,651,605 B1
(45) Date of Patent: May 16, 2023

(54) SYSTEMS AND METHODS FOR CONTEXT-AWARE TEXT EXTRACTION

(71) Applicant: INTUIT INC., Mountain View, CA (US)

(72) Inventor: Yair Horesh, Tel Aviv (IL)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 17/932,597

(22) Filed: Sep. 15, 2022

(51) Int. Cl.
*G06V 30/262* (2022.01)
*G06V 30/413* (2022.01)

(52) U.S. Cl.
CPC .......... *G06V 30/262* (2022.01); *G06V 30/413* (2022.01)

(58) Field of Classification Search
CPC .......................... G06V 30/262; G06V 30/413
See application file for complete search history.

(56) References Cited

U.S. PATENT DOCUMENTS

| | | | |
|---|---|---|---|
| 8,965,117 B1 * | 2/2015 | Rybakov | G06V 30/224 382/165 |
| 9,535,902 B1 * | 1/2017 | Michalak | G06F 16/3331 |
| 11,210,510 B2 * | 12/2021 | Rodriguez | H04L 9/3239 |
| 2016/0328610 A1 * | 11/2016 | Thompson | G06F 16/2468 |
| 2017/0249507 A1 * | 8/2017 | King | G06Q 30/0222 |
| 2019/0164313 A1 * | 5/2019 | Ma | G06V 20/40 |
| 2021/0406669 A1 * | 12/2021 | Yu | G06N 3/08 |
| 2022/0300834 A1 * | 9/2022 | Zeng | G06F 40/216 |

* cited by examiner

*Primary Examiner* — Pinalben Patel
(74) *Attorney, Agent, or Firm* — DLA Piper LLP (US)

(57) ABSTRACT

Systems and methods are provided to perform context-aware text extraction.

19 Claims, 7 Drawing Sheets

SYSTEMS AND METHODS FOR CONTEXT-AWARE TEXT EXTRACTION

BACKGROUND OF THE DISCLOSURE

Optical character recognition (OCR) is used by many organizations, systems, financial tools and programs, etc. to extract information from textual markings on a physical document or other medium. Such physical media with textual markings are widespread and can include anything from scanned documents, public signs, identification documents, photographs, mail, financial documents, receipts, etc. The goal of OCR is generally to convert the typed, handwritten, or printed text on the physical media into machine-encoded text that can then be processed by a computer, edited, searched, stored more compactly, etc.

Current text extraction techniques, such as document text extraction techniques, generally involves two phases. First, an OCR engine (e.g., Google, Amazon Textract, etc.) extracts text from an image or document. Then, a machine learning classifier extracts the entities from the OCR engine's textual output. However, many documents, such as financial forms, receipts, etc., are relatively structured and are made up of various entities. For example, a W-2 form may have a social security number (SSN) entity, an income entity, and an address entity, and a receipt may have a date entity, an amount entity, a credit card number entity, etc. When extracting text from such documents, the above two-step technique is typically used to extract text for each entity independently. Often times, however, this may not provide the best extraction, which is undesirable.

DESCRIPTION

The following detailed description is merely exemplary in nature and is not intended to limit the claimed invention or the applications of its use.

Current text extraction techniques us a two-step process that typically extracts text for each document entity independently. In other words, the technique does not consider any context or historical dependencies between entities, which is undesirable.

Embodiments of the present disclosure relate to systems and methods for context-aware text extraction. The disclosed techniques improve upon the accuracy of text extraction techniques used in various industries. In particular, the embodiments of the present disclosure leverage insights from various historical contexts to improve the accuracy of text extraction. For example, the disclosed systems and methods can utilize interdependencies between entities that reside within a document and historical data of specific users or in industry as a whole to boost the accuracy of text extraction techniques. Outputs from an OCR engine, the interdependencies between entities, and historical data can be used to construct a graph of nodes and edges. The resulting graph can be analyzed to determine the best clique (collection of nodes), where each node in the determined clique represents the final extracted value for a specific entity in a document.

The principles disclosed herein are described as being used for tax and or financial services by way of example and not limitation. It should be appreciated that the disclosed principles can be applied to various electronic services that use data and information that is user-entered or otherwise obtained from physical media.

Figure 1:
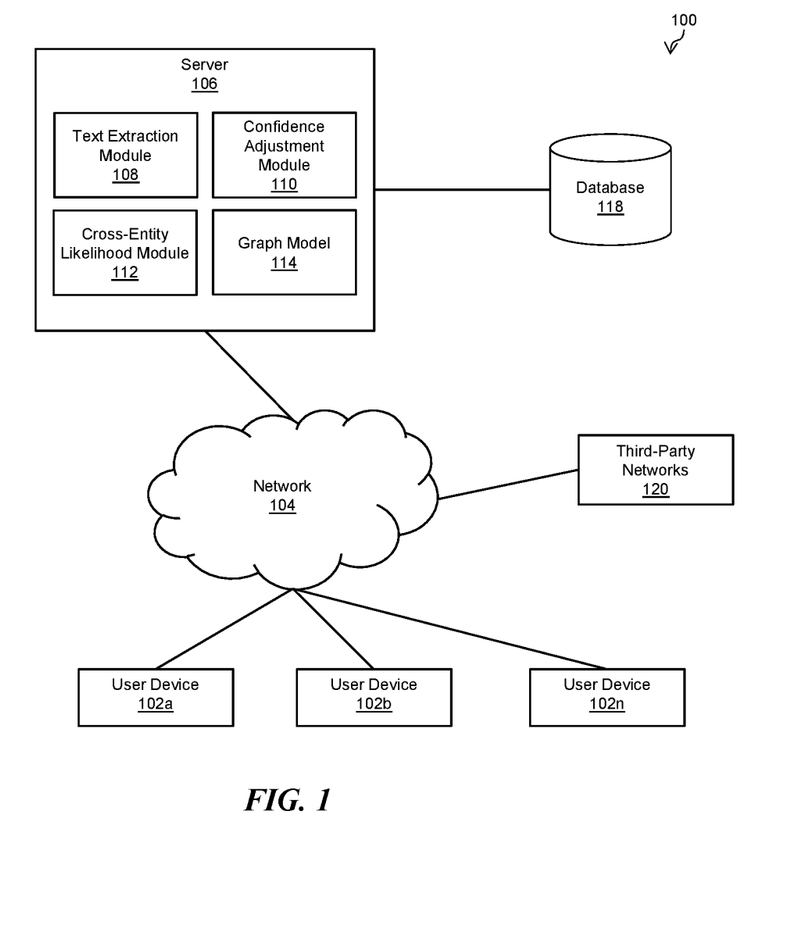
FIG. 1 is a block diagram of an example system for context-aware text extraction according to example embodiments of the present disclosure.

FIG. 1 is a block diagram of an example system 100 for context-aware text extraction according to embodiments of the present disclosure. The system 100 can include a plurality of user devices 102a-n (generally referred to herein as a "user device 102" or collectively referred to herein as "user devices 102") and a server 106, which are communicably coupled via a network 104. In some embodiments, the system 100 can include any number of user devices 102. For example, for an organization that manages accounting software or personal finance software and associated databases, there may be an extensive userbase with thousands or even millions of users that connect to the system 100 via their user devices 102. Components of the system 100 can also communicate with one or more third-party networks 120 (e.g., financial networks) via the network 104. The server 106 can be configured to receive financial transaction information from the third-party networks 120 associated with the various users of user devices 102. For example, if the system is to be used for tax and or financial services, a user can, via its user device 102, connect his/her financial instruments (e.g., checking accounts, savings accounts, credit cards, investment accounts, etc.) to a planning tool (e.g., Credit Karma™, Mint™, QuickBooks®, etc.) so that transactional information or a transactional stream is compiled on behalf of the user. Once the connection is defined, the server 106 can be authorized to obtain such information associated with the connected financial instruments from the third-party networks 120. In addition, the server 106 can receive various documents and or images of documents uploaded via the user device 102. For example, a user of a user device 102 may access an online portal or other platform in which he or she can upload images of receipts or other documents, such as a W-2. The database 118 can store the received documents, images of documents, and transactional data received from the third-party networks 120, and the stored data can be accessed by the server 106 for various processing and analysis.

A user device 102 can include one or more computing devices capable of receiving user input, transmitting and/or receiving data via the network 104, and or communicating with the server 106. In some embodiments, a user device 102 can be a conventional computer system, such as a desktop or laptop computer. Alternatively, a user device 102 can be a device having computer functionality, such as a personal digital assistant (PDA), a mobile telephone, a smartphone, or other suitable device. In some embodiments, a user device 102 can be the same as or similar to the computing device 600 described below with respect to FIG. 6.

The network 104 can include one or more wide areas networks (WANs), metropolitan area networks (MANs), local area networks (LANs), personal area networks (PANs), or any combination of these networks. The network 104 can include a combination of one or more types of networks, such as Internet, intranet, Ethernet, twisted-pair, coaxial cable, fiber optic, cellular, satellite, IEEE 801.11, terrestrial, and/or other types of wired or wireless networks. The network 104 can also use standard communication technologies and/or protocols.

The server 106 may include any combination of one or more of web servers, mainframe computers, general-purpose computers, personal computers, or other types of computing devices. The server 106 may represent distributed servers that are remotely located and communicate over a communications network, or over a dedicated network such as a local area network (LAN). The server 106 may also include one or more back-end servers for carrying out one or more aspects of the present disclosure. In some embodiments, the server 106 may be the same as or similar to server 500 described below in the context of FIG. 5.

As shown in FIG. 1, the server 106 includes a text extraction module 108, a confidence adjustment module 110, an entity determination module 112, and a graph model 114. The server 106 can access the one or more third-party networks 120 to obtain transactional data and the database 118 to access stored documents, images of documents, etc.

The text extraction module 108 includes one or more OCR engines that are configured to extract text, such as from a document or an image of a document. In some embodiments, the text extraction module 108 can include a Google® Cloud Vision OCR engine, Amazon® Textract, or various other OCR engines known to one skilled in the art. In some embodiments, the text extraction module 108 can include various tools to extract text on a per-entity basis. For example, entities can include, but are not limited to, a company/entity involved in the transaction, a company branch or branch-like identifier (e.g., a textual identifier that determines which store in a chain was visited), date and time, location (e.g., zip code, city, state, street address), method of payment (e.g., credit card, PayPal, debit card, Venmo, ACH, etc.), online/physical transaction, an NSF event, a salary, a person's name, running numbers, card identification, money withdrawal, parking, etc. In some embodiments, the text extraction module 108 is configured to provide "K" candidate predictions, (e.g., for each entity), where K can be any number. In addition, the output of the text extraction module 108 includes a confidence level associated with each candidate prediction. In some embodiments, the value of K can be a predefined number, a dynamically defined number, or based on one or more conditions.

The confidence adjustment module 110 is configured to adjust and or refine the confidence values associated with candidate predictions generated by the text extraction module 108. The adjustments can be made by leveraging historical records of a user associated with the document being analyzed. The confidence adjustment module 110 is configured to access historical records of the user from the database 118 and adjust the confidence values based on these historical records. In particular, the confidence adjustment module 110 can identify entities in the historical records of the user that have a high prominence or confidence (i.e., have appeared at a high rate). If a candidate prediction received from the text extraction module 108 matches a historical entity record with a high prominence, then the confidence adjustment module 110 adjusts the confidence level of the candidate prediction based on the historical prominence. For example, the text extraction module 108 can output a candidate prediction for a credit card number with a confidence value of 89%. If, within the user's historical records, that user makes 98% of purchases with a specific credit card number, the confidence adjustment module 110 can adjust the 89% confidence value upwards, e.g., to the maximum value of the two (i.e., 98%). However, other methods of upwards (or downwards) adjustments are possible, including averaging, weighted sum, or other techniques.

The cross-entity likelihood module 112 is configured to compute cross-entity likelihoods for extracted candidate predictions. In one or more embodiments, the cross-entity likelihood module 112 is configured to utilize interdependencies and other relations between entities to further improve the accuracy of the extraction process. In particular, the cross-entity likelihood module 112 can, for each candidate prediction of each entity output by the text extraction module 108, calculate a likelihood that the respective candidate prediction for a first entity will co-appear with another candidate prediction for a different entity. In some embodiments, the cross-entity likelihood module 112 can calculate, for a candidate prediction, a likelihood that it will co-appear with each candidate prediction of each entity in the document. The cross-entity likelihood module 112 is configured to access the database 118 to obtain and process various historical records to compute the likelihoods. The historical records accessed by the cross-entity likelihood module 112 can include data beyond personal data associated with the user, such as industry wide data. In some embodiments, the historical data can be predefined or filtered e.g., via a desired timeframe. For example, if historical data suggests that when a vendor entity is McDonalds®, the likelihood of the amount entity being $100 or more is 0.1%, the likelihood between candidate predictions of McDonalds® and $100 or more can be set to 0.1%. In some embodiments, some fields (e.g., payment amounts) may be binned when determining likelihoods. That is, the interdependency between entities may involve a likelihood that, given a vendor A, the amount is between B and C.

Figure 5:
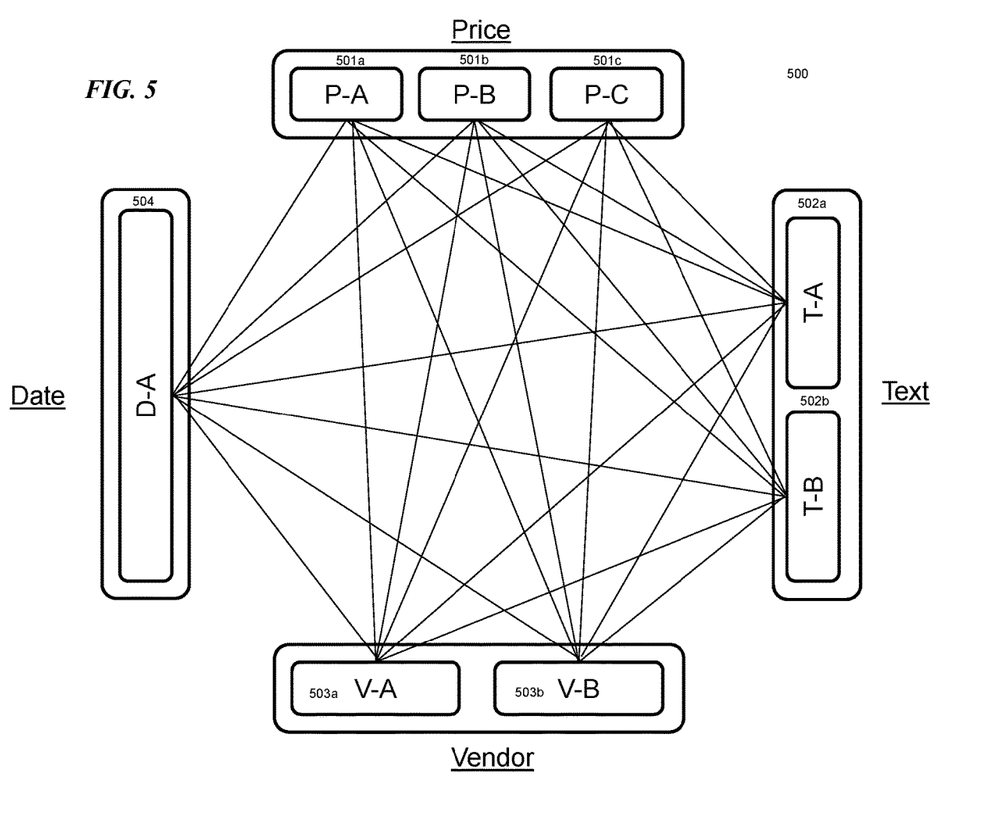
FIG. 5 shows an example graph according to some embodiments of the present disclosure.

The graph model 114 is configured to receive the adjusted confidence values from the confidence adjustment module 110 and the cross-entity likelihoods calculated by the cross-entity likelihood module 112 and construct a graph using these values and likelihoods. The graph model 114 includes various nodes, where each node can represent a candidate prediction for a certain entity. In one or more embodiments, the candidate predictions for each of the entities in a received document form the nodes of the graph. Each node can have the adjusted confidence value as a node P-value for use in graph analysis. In addition, the possible connections between entities are defined as edges (which generally includes an edge probability) that include the likelihoods computed by the cross-entity likelihood module 112. In cases where a connection is possible in more than one direction (i.e., where a candidate prediction for one entity can be connected to multiple candidate predictions for a different entity), each direction is represented by a different edge. Once the graph is constructed, the graph model 114 analyzes the graph to determine the best clique, or selection of nodes. A clique includes one node for each entity within the document. In one or more embodiments, a clique includes a final extracted value for each entity within the document and can be used as a full textual extraction output. An example graph is shown in FIG. 5.

Figure 2:
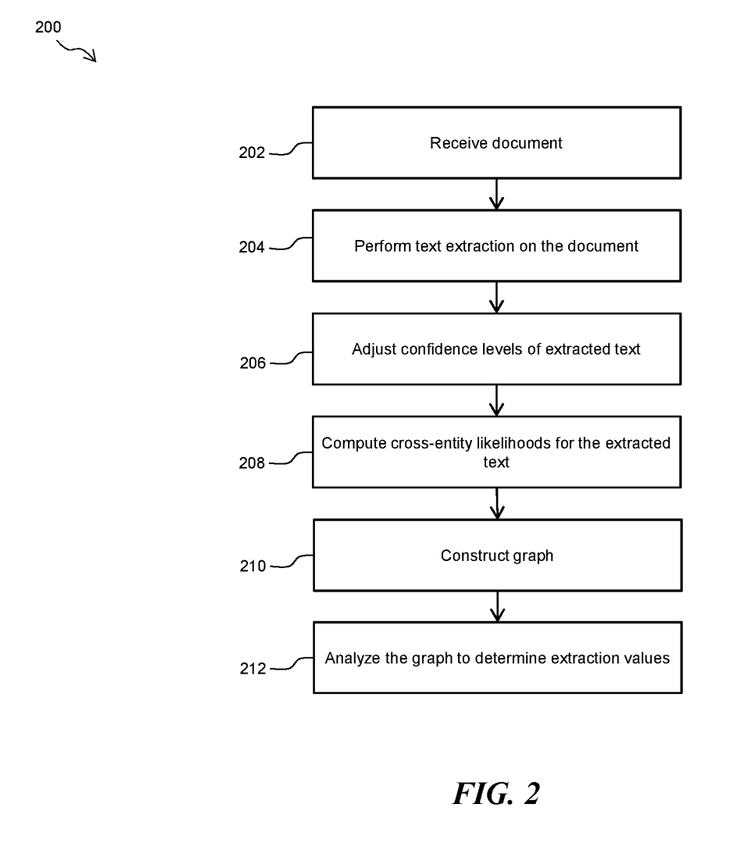
FIG. 2 is a flowchart of an example process for context-aware text extraction according to example embodiments of the present disclosure.

FIG. 2 is a flowchart of an example process 200 for context-aware text extraction according to embodiments of the present disclosure. In some embodiments, process 200 is performed within the system 100 of FIG. 1, such as by the server 106 and its various modules. At block 202, the server 106 receives a document, an image of a document, or some other similar medium that contains text, which can be handwritten, typed, printed, etc. In some embodiments, the document can be received from a user device 102. For example, a user can access a portal or online platform via the user device 102 and upload a document, which for a tax or financial application may be a W-2 form, receipt, invoice, etc. that is desired to be analyzed for tax purposes, financial purposes, or as part of another type of service.

At block 204, the text extraction module 108 performs a text extraction procedure on the received document via one or more OCR engines, such as a Google® OCR engine, Amazon® Textract, or other standard OCR engines. In some embodiments, the text extraction procedure can include extracting text on a per-entity basis via entity-specific extractors. For example, the text extraction module 108 can include an extractor that is specifically configured to extract text from an income entity, such as on a W-2 form. Another extractor could be configured to extract text from a credit card number entity. In some embodiments, performing the text extraction procedure can include extracting, for each entity, K candidate predictions and a confidence value associated with each candidate prediction.

At block 206, the confidence adjustment module 110 adjusts the confidence levels of the extracted text. In some embodiments, the confidence adjustment module 110 adjusts the confidence value for each of the various candidate predictions generated by the text extraction module 108. In some embodiments, the adjustments can be made by leveraging historical records (this can also be referred to as historical data or a plurality of historical data) of a user associated with the received document. For example, the confidence adjustment module 110 can access the database 118 and adjust the confidence values based on these historical records. In some embodiments, the confidence adjustment module 110 identifies entities in the historical records of the user that have a high prominence within the historical records, such as a specific credit card number that is used for a high percentage of the user's purchases. If a candidate prediction received from the text extraction module 108 matches a historical entity record with high prominence, then the confidence adjustment module 110 adjusts the confidence level of the candidate prediction based on the historical prominence. Additional details with respect to adjusting confidence values are discussed below in relation to FIG. 3.

At block 208, the cross-entity likelihood module 112 computes a plurality of cross-entity likelihoods for the extracted text. In some embodiments, computing the cross-entity likelihoods includes computing likelihoods for each of the extracted candidate predictions by utilizing and leveraging interdependencies and other relations between known entities of the received document. In some embodiments, the cross-entity likelihood module 112 calculates, for each candidate prediction of each entity, a likelihood that the respective candidate prediction for a first entity will co-appear with another candidate prediction for a different entity. In some embodiments, this can be calculated using $P(A|B)$ and $P(B|A)$, where A and B are candidate predictions, such as e.g., a max function, an average, a weighted mean, etc. This can include computing, for a candidate prediction, a likelihood that it will co-appear with each other candidate prediction of each other entity in the document. The interdependencies and relationships between entities of documents are obtained by analyzing historical records obtained from the database 118. These historical records can include both personalized data and un-personalized data, such as industry wide data on the associated document. In some embodiments, the historical data can be predefined or filtered e.g., via a desired timeframe. Additional details with respect to computing cross-entity likelihoods are discussed below in relation to FIG. 4.

At block 210, the graph model 114 constructs a graph using the candidate predictions and the adjusted confidence values and likelihoods associated with each candidate prediction. The graph model 114 can form nodes of the graph with each of the candidate predictions for each of the entities extracted from the received document, where each node includes its associated adjusted confidence value as a node P-value. In addition, the edges connecting the various nodes (i.e., connecting the various candidate predictions for different entities) include the likelihoods computed by the cross-entity likelihood module 112 as their respective edge probabilities.

At block 212, the graph model 114 analyzes the generated graph to select a clique, or selection of nodes. Because the graph's nodes correspond to the candidate predictions for the entities of the document, a clique therefore includes the extraction values for each entity of the received document. In one or more embodiments, once a clique is selected, this indicates the final extracted textual value for each entity in the document. In some embodiments, to select a clique, the graph model 114 performs one or more optimization techniques to find a maximum edge-weighted clique in the graph, such as the technique disclosed in "A Maximum Edge-Weight Clique Extraction Algorithm Based on Branch-and-Bound" by Shimizu et al. (2018), which is herein incorporated by reference in its entirety and attached as Appendix I. The graph model 114 can, for each potential clique, evaluate the suggestions that are all interconnected by determining a confidence value and how strongly they are linked. Such determinations can include multiple types of heuristics, such as genetic algorithms, a greedy search, brute force, and others. In addition, what constitutes a "good" clique (i.e., a clique with the best combination of vertex weight (adjusted confidence values) and edge weight (likelihoods)) can vary. For example, in some embodiments, 50% of a clique score can be based on average node weight and the other 50% can be based on the average edge weight. However, this is merely exemplary in nature and various weighting techniques (normalization, averaging, harmonic mean, etc.) can be used to evaluate the strength of a clique.

Figure 3:
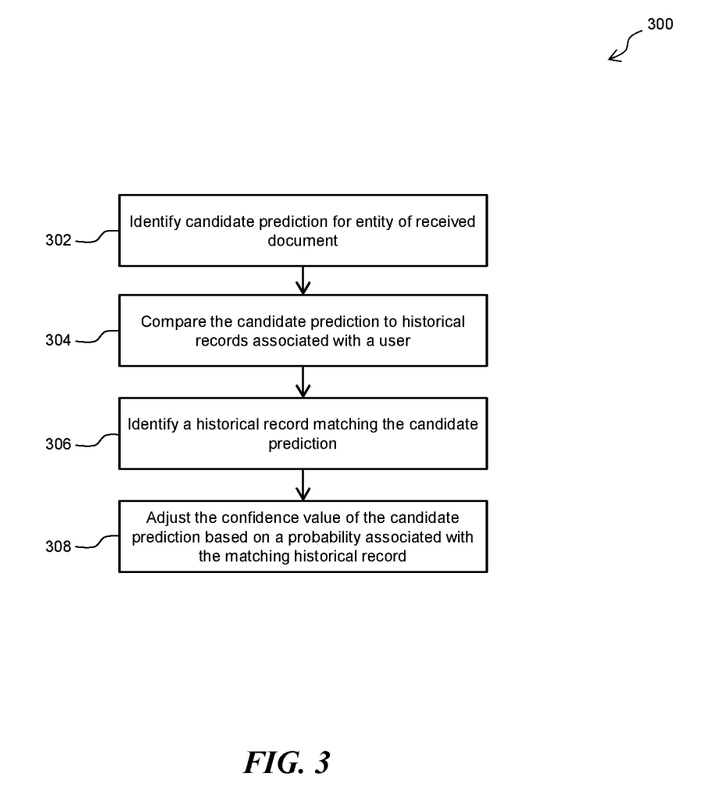
FIG. 3 is a flowchart of an example process for adjusting confidence values according to example embodiments of the present disclosure.

FIG. 3 is a flowchart of an example process 300 for adjusting confidence values according to embodiments of the present disclosure. Process 300 can be performed by the confidence adjustment module 110 at block 206 of process 200. In particular, the steps of process 300 are performed on the candidate predictions and associated confidence values that are generated by the one or more OCR engines of the text extraction module 108. At block 302, confidence adjustment module 110 identifies a candidate extraction for an entity within the received document. For example, the confidence adjustment module 110 can identify that "4567" is a candidate prediction for the last four digits of a credit card number on a receipt.

At block 304, the confidence adjustment module 110 compares the candidate prediction to historical records associated with the user from which the receipt was submitted. For example, the confidence adjustment module 110 can query the database 118 for records and/or statistics associated with the user (e.g., via ID, name, SSN, or other identifiers). At block 306, the confidence adjustment module 110 identifies a historical record matching the candidate prediction. For example, the confidence adjustment module 110 can identify that 95% of the user's purchases in the historical records use the credit card ending in "4567." At block 308, the confidence adjustment module 110 adjusts the confidence value of the candidate prediction based on the probability associated with the matching historical record, such as by adjusting, if the confidence value is lower than the matched probability, the confidence value to equal the probability.

Figure 4:
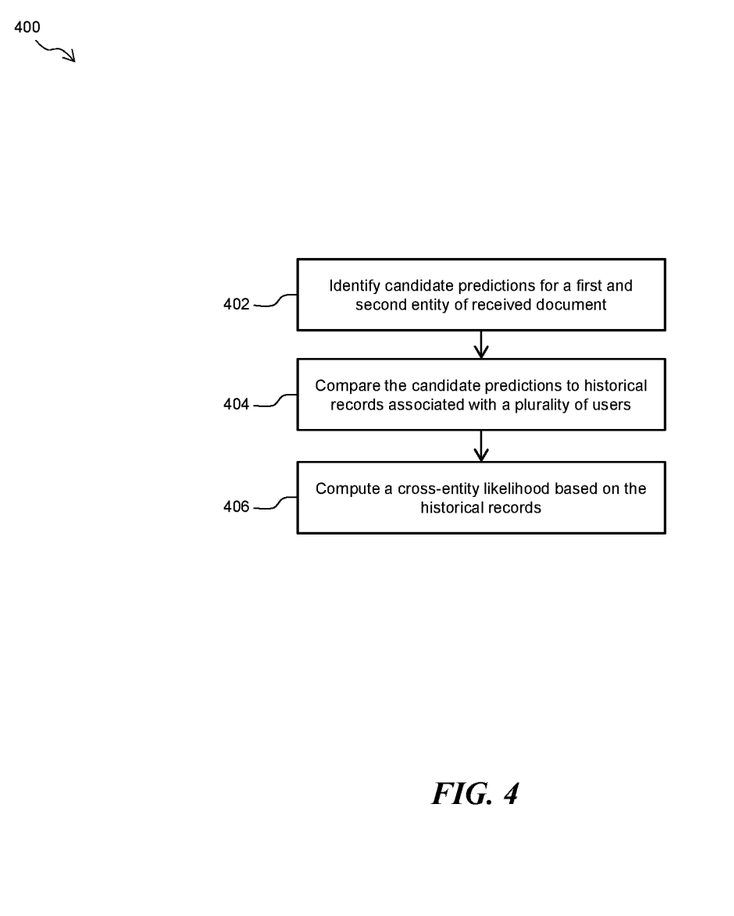
FIG. 4 is a flowchart of an example process for computing a cross-entity likelihood according to example embodiments of the present disclosure.

FIG. 4 is a flowchart of an example process 400 for computing a cross-entity likelihood according to embodiments of the present disclosure. Process 400 can be performed by the cross-entity likelihood module 112 at block 208 of process 200. In particular, the steps of process 400 are performed on the candidate predictions that are generated by the one or more OCR engines of the text extraction module 108. At block 402, the cross-entity likelihood module 112 identifies a candidate prediction for each of a first and second entity of the received document. For example, the cross-entity likelihood module 112 can identify "McDonalds®" as a candidate prediction for a vendor entity and $100 as a candidate prediction for an amount entity. At block 404, the cross-entity likelihood module 112 compares the candidate predictions to historical records associated with a plurality of users from the database 118. For example, the cross-entity likelihood module 112 can determine that, within the historical records, $100 was spent at McDonalds® less than 1% of the time. At block 406, the cross-entity likelihood module 112 computes a cross-entity likelihood based on the historical records. For example, the cross-entity likelihood module 112 could set the value of the likelihood to the associated probability found in the previous block.

FIG. 5 shows an example graph 500 according to some embodiments of the present disclosure. The graph 500 can be used for context-aware text extraction of a receipt (or other document) that includes a price entity, a date entity, a text entity, and a vendor entity (original document is not shown). The graph 500 includes various candidate predictions for each entity, such as price candidate predictions 501a-501c, text candidate predictions 502a-b, vendor candidate predictions 503a-b, and a date candidate prediction 504. Each candidate prediction has an associated confidence value (value not shown). In addition, the graph 500 includes a plurality of edges (i.e., the lines) that connect each candidate prediction with the other possible candidate predictions. All candidate predictions are connected to the candidate from different entities.

Figure 6:
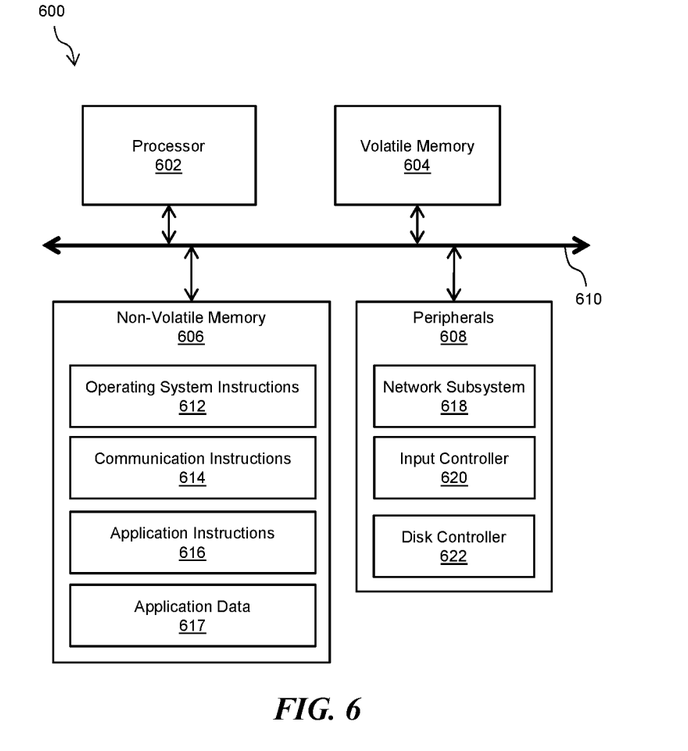
FIG. 6 is an example server device that can be used within the system of FIG. 1 according to an embodiment of the present disclosure.

FIG. 6 is a diagram of an example server device 600 that can be used within system 100 of FIG. 1. Server device 600 can implement various features and processes as described herein. Server device 600 can be implemented on any electronic device that runs software applications derived from complied instructions, including without limitation personal computers, servers, smart phones, media players, electronic tablets, game consoles, email devices, etc. In some implementations, server device 600 can include one or more processors 602, volatile memory 604, non-volatile memory 606, and one or more peripherals 608. These components can be interconnected by one or more computer buses 610.

Processor(s) 602 can use any known processor technology, including but not limited to graphics processors and multi-core processors. Suitable processors for the execution of a program of instructions can include, by way of example, both general and special purpose microprocessors, and the sole processor or one of multiple processors or cores, of any kind of computer. Bus 610 can be any known internal or external bus technology, including but not limited to ISA, EISA, PCI, PCI Express, USB, Serial ATA, or FireWire. Volatile memory 604 can include, for example, SDRAM. Processor 602 can receive instructions and data from a read-only memory or a random access memory or both. Essential elements of a computer can include a processor for executing instructions and one or more memories for storing instructions and data.

Non-volatile memory 606 can include by way of example semiconductor memory devices, such as EPROM, EEPROM, and flash memory devices; magnetic disks such as internal hard disks and removable disks; magneto-optical disks; and CD-ROM and DVD-ROM disks. Non-volatile memory 606 can store various computer instructions including operating system instructions 612, communication instructions 614, application instructions 616, and application data 617. Operating system instructions 612 can include instructions for implementing an operating system (e.g., Mac OS®, Windows®, or Linux). The operating system can be multi-user, multiprocessing, multitasking, multithreading, real-time, and the like. Communication instructions 614 can include network communications instructions, for example, software for implementing communication protocols, such as TCP/IP, HTTP, Ethernet, telephony, etc. Application instructions 616 can include instructions for various applications. Application data 617 can include data corresponding to the applications.

Peripherals 608 can be included within server device 600 or operatively coupled to communicate with server device 600. Peripherals 608 can include, for example, network subsystem 618, input controller 620, and disk controller 622. Network subsystem 618 can include, for example, an Ethernet of WiFi adapter. Input controller 620 can be any known input device technology, including but not limited to a keyboard (including a virtual keyboard), mouse, track ball, and touch-sensitive pad or display. Disk controller 622 can include one or more mass storage devices for storing data files; such devices include magnetic disks, such as internal hard disks and removable disks; magneto-optical disks; and optical disks.

Figure 7:
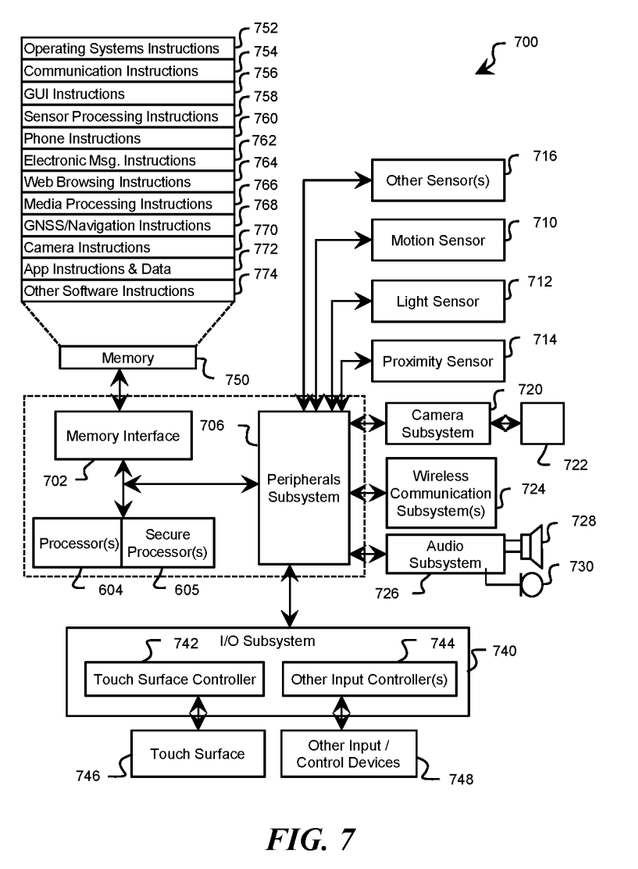
FIG. 7 is an example computing device that can be used within the system of FIG. 1 according to an embodiment of the present disclosure.

FIG. 7 is an example computing device that can be used within the system 100 of FIG. 1, according to an embodiment of the present disclosure. In some embodiments, device 700 can be user device 102. The illustrative user device 700 can include a memory interface 702, one or more data processors, image processors, central processing units 704, and or secure processing units 705, and peripherals subsystem 706. Memory interface 702, one or more central processing units 704 and or secure processing units 705, and or peripherals subsystem 706 can be separate components or can be integrated in one or more integrated circuits. The various components in user device 700 can be coupled by one or more communication buses or signal lines.

Sensors, devices, and subsystems can be coupled to peripherals subsystem 706 to facilitate multiple functionalities. For example, motion sensor 710, light sensor 712, and proximity sensor 714 can be coupled to peripherals subsystem 706 to facilitate orientation, lighting, and proximity functions. Other sensors 716 can also be connected to peripherals subsystem 706, such as a global navigation satellite system (GNSS) (e.g., GPS receiver), a temperature sensor, a biometric sensor, magnetometer, or other sensing device, to facilitate related functionalities.

Camera subsystem 720 and optical sensor 722, e.g., a charged coupled device (CCD) or a complementary metal-oxide semiconductor (CMOS) optical sensor, can be utilized to facilitate camera functions, such as recording photographs and video clips. Camera subsystem 720 and optical sensor 722 can be used to collect images of a user to be used during authentication of a user, e.g., by performing facial recognition analysis.

Communication functions can be facilitated through one or more wired and or wireless communication subsystems 724, which can include radio frequency receivers and transmitters and or optical (e.g., infrared) receivers and transmitters. For example, the Bluetooth (e.g., Bluetooth low energy (BTLE)) and or WiFi communications described herein can be handled by wireless communication subsystems 724. The specific design and implementation of communication subsystems 724 can depend on the communication network(s) over which the user device 700 is intended to operate. For example, user device 700 can include communication subsystems 724 designed to operate over a GSM network, a GPRS network, an EDGE network, a WiFi or WiMax network, and a Bluetooth™ network. For example, wireless communication subsystems 724 can include hosting protocols such that device 700 can be configured as a base station for other wireless devices and or to provide a WiFi service.

Audio subsystem 726 can be coupled to speaker 728 and microphone 730 to facilitate voice-enabled functions, such as speaker recognition, voice replication, digital recording, and telephony functions. Audio subsystem 726 can be configured to facilitate processing voice commands, voice-printing, and voice authentication, for example.

I/O subsystem 740 can include a touch-surface controller 742 and or other input controller(s) 744. Touch-surface controller 742 can be coupled to a touch-surface 746. Touch-surface 746 and touch-surface controller 742 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch-surface 746.

The other input controller(s) 744 can be coupled to other input/control devices 748, such as one or more buttons, rocker switches, thumb-wheel, infrared port, USB port, and or a pointer device such as a stylus. The one or more buttons (not shown) can include an up/down button for volume control of speaker 728 and or microphone 730.

In some implementations, a pressing of the button for a first duration can disengage a lock of touch-surface 746; and a pressing of the button for a second duration that is longer than the first duration can turn power to user device 700 on or off. Pressing the button for a third duration can activate a voice control, or voice command, module that enables the user to speak commands into microphone 730 to cause the device to execute the spoken command. The user can customize a functionality of one or more of the buttons. Touch-surface 746 can, for example, also be used to implement virtual or soft buttons and or a keyboard.

In some implementations, user device 700 can present recorded audio and or video files, such as MP3, AAC, and MPEG files. In some implementations, user device 700 can include the functionality of an MP3 player, such as an iPod™. User device 700 can, therefore, include a 36-pin connector and or 8-pin connector that is compatible with the iPod. Other input/output and control devices can also be used.

Memory interface 702 can be coupled to memory 750. Memory 750 can include high-speed random access memory and or non-volatile memory, such as one or more magnetic disk storage devices, one or more optical storage devices, and or flash memory (e.g., NAND, NOR). Memory 750 can store an operating system 752, such as Darwin, RTXC, LINUX, UNIX, OS X, Windows, or an embedded operating system such as VxWorks.

Operating system 752 can include instructions for handling basic system services and for performing hardware dependent tasks. In some implementations, operating system 752 can be a kernel (e.g., UNIX kernel). In some implementations, operating system 752 can include instructions for performing voice authentication.

Memory 750 can also store communication instructions 754 to facilitate communicating with one or more additional devices, one or more computers and or one or more servers. Memory 750 can include graphical user interface instructions 756 to facilitate graphic user interface processing; sensor processing instructions 758 to facilitate sensor-related processing and functions; phone instructions 760 to facilitate phone-related processes and functions; electronic messaging instructions 762 to facilitate electronic messaging-related process and functions; web browsing instructions 764 to facilitate web browsing-related processes and functions; media processing instructions 766 to facilitate media processing-related functions and processes; GNSS/Navigation instructions 768 to facilitate GNSS and navigation-related processes and instructions; and or camera instructions 770 to facilitate camera-related processes and functions.

Memory 750 can store application (or "app") instructions and data 772, such as instructions for the apps described above in the context of FIGS. 1-5. Memory 750 can also store other software instructions 774 for various other software applications in place on device 700.

The described features can be implemented in one or more computer programs that can be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions can include, by way of example, both general and special purpose microprocessors, and the sole processor or one of multiple processors or cores, of any kind of computer. Generally, a processor can receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user may provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail may be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

The invention claimed is:

1. A computing system comprising:
a processor; and
a non-transitory computer-readable storage device storing computer-executable instructions, the instructions operable to cause the processor to perform operations comprising:
receiving a document associated with a user;
performing text extraction on the document, the text extraction comprising generating one or more candidate predictions and an associated confidence value for each of a first entity and a second entity in the document;
adjusting the confidence values based on a plurality of historical data associated with the user, wherein adjusting the confidence values comprises:
identifying a candidate prediction for the first entity;
comparing the identified candidate prediction to the plurality of historical data associated with the user;
identifying a historical record matching the candidate prediction; and
adjusting the associated confidence value based on a probability associated with the matching historical record;
computing a likelihood between a candidate prediction of the first entity and each of the one or more candidate predictions of the second entity;
constructing a graph based on the adjusted confidence values and the likelihoods; and
analyzing the graph to determine a final extraction values for the first and second entities.

2. The computing system of claim 1, wherein performing the text extraction comprises extracting text with one or more optical character recognition (OCR) engines.

3. The computing system of claim 2, wherein extracting the text with the one or more OCR engines comprises extracting, for each entity, a pre-defined number of candidate predictions.

4. The computing system of claim 1, wherein performing the text extraction comprises extracting text on a per-entity basis via a plurality of entity-specific text extractors.

5. The computing system of claim 1, wherein computing the likelihood between the candidate prediction of the first entity and a candidate prediction of the second entity comprises:
comparing the candidate prediction of the first entity and the candidate prediction of the second entity to a plurality of historical data associated with the document; and
computing the likelihood based on a probability from the plurality of historical data between the first entity and the second entity.

6. The computing system of claim 1, wherein constructing the graph comprises:
- configuring the one or more candidate predictions for each of the first entity and the second entity as a plurality of nodes in the graph;
- assigning the adjusted confidence values to associated nodes as a node probability value;
- configuring a plurality of edges within the graph connecting at least a portion of the plurality of nodes; and
- assigning the likelihoods as respective edge probabilities.

7. The computing system of claim 6, wherein analyzing the graph to determine the final extraction values for the first and second entities comprises calculating a clique score for each of a plurality of potential cliques in the graph.

8. The computing system of claim 7, wherein calculating the clique score comprises combining one or more node probability values and one or more edge probabilities.

9. The computing system of claim 7, wherein determining the plurality of potential cliques comprises applying at least one of a genetic algorithm, a greedy search, or a brute force algorithm.

10. A computer-implemented method for context-aware text extraction performed by at least one processor comprising:
- receiving a document associated with a user;
- performing text extraction on the document, the text extraction comprising generating one or more candidate predictions and an associated confidence value for each of a first entity and a second entity in the document;
- adjusting the confidence values based on a plurality of historical data associated with the user;
- computing a likelihood between a candidate prediction of the first entity and each of the one or more candidate predictions of the second entity, wherein computing the likelihood between the candidate prediction of the first entity and a candidate prediction of the second entity comprises:
  - comparing the candidate prediction of the first entity and the candidate prediction of the second entity to a plurality of historical data associated with the document; and
  - computing the likelihood based on a probability from the plurality of historical data between the first entity and the second entity;
- constructing a graph based on the adjusted confidence values and the likelihoods; and
- analyzing the graph to determine a final extraction values for the first and second entities.

11. The computer-implemented method of claim 10, wherein performing the text extraction comprises extracting text with one or more optical character recognition (OCR) engines.

12. The computer-implemented method of claim 11, wherein extracting the text with the one or more OCR engines comprises extracting, for each entity, a pre-defined number of candidate predictions.

13. The computer-implemented method of claim 10, wherein performing the text extraction comprises extracting text on a per-entity basis via a plurality of entity-specific text extractors.

14. The computer-implemented method of claim 10, wherein adjusting the confidence values comprises:
- identifying a candidate prediction for the first entity;
- comparing the identified candidate prediction to the plurality of historical data associated with the user;
- identifying a historical record matching the candidate prediction; and
- adjusting the associated confidence value based on a probability associated with the matching historical record.

15. The computer-implemented method of claim 10, wherein constructing the graph comprises:
- configuring the one or more candidate predictions for each of the first entity and the second entity as a plurality of nodes in the graph;
- assigning the adjusted confidence values to associated nodes as a node probability value;
- configuring a plurality of edges within the graph connecting at least a portion of the plurality of nodes; and
- assigning the likelihoods as respective edge probabilities.

16. The computer-implemented method of claim 15, wherein analyzing the graph to determine the final extraction values for the first and second entities comprises calculating a clique score for each of a plurality of potential cliques in the graph.

17. The computer-implemented method of claim 16, wherein calculating the clique score comprises combining one or more node probability values and one or more edge probabilities.

18. The computer-implemented method of claim 16, wherein determining the plurality of potential cliques comprises applying at least one of a genetic algorithm, a greedy search, or a brute force algorithm.

19. A computing system comprising:
- a processor; and
- a non-transitory computer-readable storage device storing computer-executable instructions, the instructions operable to cause the processor to perform operations comprising:
  - receiving a document associated with a user;
  - performing text extraction on the document, the text extraction comprising generating one or more candidate predictions and an associated confidence value for each of a first entity and a second entity in the document;
  - adjusting the confidence values based on a plurality of historical data associated with the user;
  - computing a likelihood between a candidate prediction of the first entity and each of the one or more candidate predictions of the second entity;
  - constructing a graph based on the adjusted confidence values and the likelihoods, wherein constructing the graph comprises:
    - configuring the one or more candidate predictions for each of the first entity and the second entity as a plurality of nodes in the graph;
    - assigning the adjusted confidence values to associated nodes as a node probability value;
    - configuring a plurality of edges within the graph connecting at least a portion of the plurality of nodes; and
    - assigning the likelihoods as respective edge probabilities; and
  - analyzing the graph to determine a final extraction values for the first and second entities.

* * * * *